US010340092B2

(12) United States Patent
Demizu et al.

(10) Patent No.: US 10,340,092 B2
(45) Date of Patent: *Jul. 2, 2019

(54) SOLID ELECTROLYTIC CAPACITOR

(71) Applicant: Murata Manufacturing Co., Ltd., Nagaokakyo-shi, Kyoto-fu (JP)

(72) Inventors: Hiroyuki Demizu, Nagaokakyo (JP); Kenichi Oshiumi, Nagaokakyo (JP); Tomohiro Suzuki, Nagaokakyo (JP); Shinya Yoshida, Nagaokakyo (JP); Koji Fujimoto, Nagaokakyo (JP); Tadahisa Sano, Nagaokakyo (JP); Tsuyoshi Yamamoto, Nagaokakyo (JP); Yoshinori Ueda, Nagaokakyo (JP); Shinji Otani, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,305

(22) Filed: Jun. 14, 2017

(65) Prior Publication Data

US 2017/0365415 A1 Dec. 21, 2017

(30) Foreign Application Priority Data

Jun. 15, 2006 (JP) .................................. 2016-118973
Jun. 15, 2016 (JP) .................................. 2016-118972
(Continued)

(51) Int. Cl.
*H01G 9/15* (2006.01)
*H01G 9/08* (2006.01)
(Continued)

(52) U.S. Cl.
CPC ............ *H01G 9/048* (2013.01); *H01G 9/008* (2013.01); *H01G 9/045* (2013.01); *H01G 9/07* (2013.01);
(Continued)

(58) Field of Classification Search
CPC .......... H01G 9/048; H01G 9/045; H01G 9/07; H01G 9/15; H01G 2009/0408
See application file for complete search history.

(56) References Cited

U.S. PATENT DOCUMENTS

| 5,712,758 | A  | * | 1/1998  | Amano  | ............... | H01G 4/2325 |
|           |    |   |         |        |                 | 361/306.3   |
| 6,791,822 | B2 |   | 9/2004  | Kochi et al. |           |             |
| 9,490,076 | B2 |   | 11/2016 | Otani et al. |           |             |
| 9,978,531 | B2 |   | 5/2018  | Kimura et al. |          |             |
| 2004/0027789 | A1 | * | 2/2004 | Kochi | ................... | H01G 9/012 |
|           |    |   |         |        |                 | 361/523     |

(Continued)

FOREIGN PATENT DOCUMENTS

CN  100350526 C     11/2007
WO  WO 2013088954 A1  6/2013
WO  WO 2014188833 A1  11/2014

*Primary Examiner* — Dion Ferguson
(74) *Attorney, Agent, or Firm* — Arent Fox LLP

(57) ABSTRACT

A solid electrolytic capacitor that includes a capacitor element including an anode portion having a metal layer, a dielectric layer, and a cathode portion having a solid electrolyte layer and a current collector layer; a leading conductor layer; an insulating resin body covering the capacitor element and the leading conductor layer, the insulating resin body having a first end surface and a second end surface opposite to each other; a first external electrode; and a second external electrode. The first external electrode has at least one plating layer on the first end surface, and is connected to the leading conductor layer at the first end surface. The second external electrode has at least one plating layer on the second end surface, and is connected to the metal layer at the second end surface.

17 Claims, 9 Drawing Sheets

(30) Foreign Application Priority Data

Jun. 15, 2016 (JP) .................................. 2016-118975
Jun. 6, 2017 (JP) .................................. 2017-112109
Jun. 12, 2017 (JP) .................................. 2017-115327

(51) Int. Cl.
*H01G 9/048* (2006.01)
*H01G 9/045* (2006.01)
*H01G 9/07* (2006.01)
*H01G 9/008* (2006.01)
*H01G 9/04* (2006.01)

(52) U.S. Cl.
CPC .................. *H01G 9/08* (2013.01); *H01G 9/15* (2013.01); *H01G 2009/0408* (2013.01)

(56) References Cited

U.S. PATENT DOCUMENTS

| | | | |
|---|---|---|---|
| 2004/0264111 A1 | 12/2004 | Shimoyama et al. | |
| 2006/0279907 A1 | 12/2006 | Doffing et al. | |
| 2007/0019366 A1* | 1/2007 | Yamaguchi | H01G 2/065 |
| | | | 361/540 |
| 2009/0296318 A1* | 12/2009 | Kawahito | H01G 9/04 |
| | | | 361/540 |
| 2010/0165547 A1* | 7/2010 | Kuranuki | H01G 9/012 |
| | | | 361/525 |
| 2012/0069489 A1 | 3/2012 | Takeuchi et al. | |
| 2014/0285951 A1* | 9/2014 | Otani | H01G 9/012 |
| | | | 361/528 |
| 2016/0071654 A1* | 3/2016 | Kimura | H01G 9/14 |
| | | | 361/528 |
| 2017/0365419 A1* | 12/2017 | Demizu | H01G 11/28 |

* cited by examiner

FIG.10

| | EXAMPLE 18 | EXAMPLE 19 | EXAMPLE 20 | EXAMPLE 21 | EXAMPLE 22 |
|---|---|---|---|---|---|
| 1ST END SURFACE | | | | | |
| 2ND END SURFACE | | | | | |
| ASSESSMENT | OK | OK | OK | OK | OK |

SOLID ELECTROLYTIC CAPACITOR

CROSS REFERENCE TO RELATED APPLICATIONS

The present application claims priority to Japanese Patent Application No. 2016-118972, filed Jun. 15, 2016, Japanese Patent Application No. 2016-118973, filed Jun. 15, 2016, Japanese Patent Application No. 2016-118975, filed Jun. 15, 2016, Japanese Patent Application No. 2017-112109, filed Jun. 6, 2017, and Japanese Patent Application No. 2017-115327, filed Jun. 12, 2017, the entire contents of each of which are incorporated herein by reference.

BACKGROUND OF THE INVENTION

Field of the Invention

The present invention relates to a solid electrolytic capacitor.

Description of the Background Art

A solid electrolytic capacitor described in International Publication No. 2013/088954 includes a stack of a plurality of capacitor elements, an anode terminal bonded to a side surface of the stack, and a cathode terminal bonded to a portion of a main surface of the stack and a side surface of the stack. The stack is also entirely covered with resin.

SUMMARY OF THE INVENTION

In the solid electrolytic capacitor described in International Publication No. 2013/088954, the anode terminal and the cathode terminal are each drawn out from the center of the stack in the stacking direction to an outside of the resin and thus routed outside the resin to face one main surface of the stack. Even with such a configuration, there is still the need for further reducing the solid electrolytic capacitor's ESR (Equivalent Series Resistance) and ESL (Equivalent Series Inductance). In addition, there is a need to reduce the size of the solid electrolytic capacitor's external shape.

Further, the solid electrolytic capacitor disclosed in International Publication No. 2013/088954 is configured such that the anode terminal and the cathode terminal are partially buried in a resin layer. In such a configuration, for the purpose of miniaturization, a change is made such that a plurality of capacitor elements have an anode side exposed at an end surface on the side of one end of the resin and an external electrode for the anode is provided on the end surface of the resin by plating or the like so as to cover the end surface while the external electrode is brought into contact with the exposed portion of the anode side of the capacitor element. Simultaneously, a leading conductor for a cathode connected to the stack is also exposed at an end surface of the other end side of the resin and an external electrode for the cathode is provided on the end surface of the resin by plating or the like so as to cover the end surface while the external electrode is brought into contact with the exposed portion of the end portion of the leading conductor.

In such a case, after the plurality of capacitor elements and the leading conductor layer are molded with resin, the resin mold is cut to expose the capacitor elements' anode side and expose the end portion of the leading conductor layer. If an external electrode is formed to extend from an end surface to a main surface without processing of an end surface (or cut surface) of the cut resin mold, the external electrode poorly adheres and tends to peel off at a boundary between the end surface of the resin and the main surface of the resin. As a result, an electric resistance between a portion of the external electrode provided on the end surface and a portion of the external electrode provided on the main surface is increased.

The present invention has been made in view of the above problems, and an object of the present invention is to provide a compact solid electrolytic capacitor with reduced ESR and ESL.

Another object of the present invention is to provide a compact solid electrolytic capacitor maintaining reliability.

A further object of the present invention is to provide a solid electrolytic capacitor capable of suppressing peeling of an external electrode provided on an end surface of a resin body in which a capacitor element is buried.

A solid electrolytic capacitor based on an aspect of the present invention comprises at least one capacitor element including an anode portion composed of a metal layer extending in a first direction and having an external surface provided with a plurality of recesses, a dielectric layer provided on the external surface of the metal layer, and a cathode portion having a solid electrolyte layer provided on the dielectric layer and a current collector layer provided on the solid electrolyte layer; a leading conductor layer electrically connected to the current collector layer; an insulating resin body covering the capacitor element and the leading conductor layer, the insulating resin body having a first end surface and a second end surface opposite to each other. The first external electrode has at least one plating layer on the first end surface, and is connected to the leading conductor layer at the first end surface. The second external electrode has at least one plating layer provided on the second end surface, and is connected to the metal layer at the second end surface.

In the solid electrolytic capacitor, preferably, a plurality of conductive particles are present in each of the first end surface and the second end surface.

In the solid electrolytic capacitor the conductive particles preferably contain Pd.

In the solid electrolytic capacitor, the at least one plating layer of the first external electrode preferably includes a first plating layer on the first end surface, a second plating layer on the first plating layer, and a third plating layer on the second plating layer, and the at least one plating layer of the second external electrode preferably includes a fourth plating layer on the second end surface, a fifth plating layer on the fourth plating layer, and a sixth plating layer on the fifth plating layer. Preferably, each of the first and fourth plating layers contain Cu, the second and fifth plating layers contain Ni, and the third and sixth plating layers contain Sn.

In the solid electrolytic capacitor of the present invention, the metal layer preferably contains Al.

In the solid electrolytic capacitor of the present invention, the dielectric layer is preferably composed of an oxide of Al.

In a further aspect of the present invention, an external surface of the dielectric layer located on a side opposite to that of the cathode portion and free of the solid electrolyte layer, and provided on an external surface of the metal layer closer to the second end surface, is preferably covered with an insulating resin layer different in composition from the insulating resin body.

Preferably, a length of the insulating resin layer in the first direction is preferably equal to or greater than a length of the insulating resin body in the first direction multiplied by 0.025 and equal to or less than the length of the insulating resin body in the first direction multiplied by 0.5.

In the solid electrolytic capacitor, the insulating resin layer is preferably 5 μm to 30 μm in thickness.

The insulating resin layer also preferably includes polyimide resin or polyamide imide resin.

In the solid electrolytic capacitor based on another aspect of the present invention, an end surface of the metal layer closer to the second end surface is preferably covered with a first plating film containing Zn and the first plating film is preferably covered with a second plating film containing Ni. Furthermore, the second external electrode is preferably indirectly electrically connected to the metal layer. In that case, the first plating film and the second plating film are preferably provided between the second external electrode and the metal layer.

The solid electrolytic capacitor based on yet another aspect of the present invention preferably comprises a plurality of capacitor elements. Furthermore, the plurality of capacitor elements are preferably stacked in a second direction orthogonal to the first direction, with mutually adjacent capacitor elements having their respective current collector layers electrically connected to each other. In that case, the current collector layer of only one capacitor element of the plurality of capacitor elements that is adjacent to the leading conductor layer is electrically connected to the leading conductor layer.

In the solid electrolytic capacitor, the first end surface and the second end surface preferably have a surface roughness (Ra) of 2.2 μm to 8.3 μm.

In the solid electrolytic capacitor based on a further aspect of the present invention, the insulating resin body preferably further has a first main surface and a second main surface opposite to each other in a second direction orthogonal to the first direction, and a first side surface and a second side surface opposite to each other in a third direction orthogonal to the first direction and the second direction. Furthermore, the insulating resin body preferably has a first connecting portion connecting the first end surface and the first main surface, a second connecting portion connecting the first end surface and the second main surface, a third connecting portion connecting the second end surface and the first main surface, and a fourth connecting portion connecting the second end surface and the second main surface. Furthermore, the first external electrode is preferably provided so as to extend from at least the first end surface to the first main surface and the second main surface across the first connecting portion and the second connecting portion, and the second external electrode is preferably provided so as to extend from at least the second end surface to the first main surface and the second main surface across the third connecting portion and the fourth connecting portion. In that case, the first connecting portion, the second connecting portion, the third connecting portion, and the fourth connecting portion each have a first chamfered portion.

In the solid electrolytic capacitor based on an additional aspect of the present invention, the first chamfered portion may have a bent shape in a cross-sectional view as seen in the third direction.

In the solid electrolytic capacitor based on another aspect of the present invention, the first chamfered portion may have a curved shape in a cross-sectional view as seen in the third direction.

In the solid electrolytic capacitor, a radius of curvature of the first chamfered portion of the first and third connecting portions is preferably larger than a radius of curvature of the first chamfered portion of the second and fourth connecting portions.

In the solid electrolytic capacitor based on an additional aspect of the present invention, the insulating resin body preferably includes a first insulating resin portion on a side of the first main surface and which defines the first main surface, and a second insulating resin portion on a side of the second main surface and which defines the second main surface. In that case, the second insulating resin portion is preferably made of a material harder than that of the first insulating resin portion. Furthermore, the first chamfered portion of the first and third connecting portions is preferably rounder than the first chamfered portion of the second and fourth connecting portions.

In the solid electrolytic capacitor based on another aspect of the present invention, the insulating resin body may have a fifth connecting portion connecting the first end surface and the first side surface, a sixth connecting portion connecting the first end surface and the second side surface, a seventh connecting portion connecting the second end surface and the first side surface, and an eighth connecting portion connecting the second end surface and the second side surface. In that case, the first external electrode preferably extends from the first end surface across the first connecting portion, the second connecting portion, the fifth connecting portion, and the sixth connecting portion to the first and second main surfaces and the first and second side surfaces, and the second external electrode preferably extends from the second end surface across the third connecting portion, the fourth connecting portion, the seventh connecting portion, and the eighth connecting portion to the first and second main surfaces and the first and second side surfaces. Furthermore, the fifth connecting portion, the sixth connecting portion, the seventh connecting portion, and the eighth connecting portion preferably each have a second chamfered portion.

In the solid electrolytic capacitor, the second chamfered portion may have a bent shape in a cross-sectional view as seen in the second direction.

In the solid electrolytic capacitor, the second chamfered portion may have a curved shape in a cross-sectional view as seen in the second direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows images of solid electrolytic capacitors according to Examples 18-22 at first and second end surfaces each in a front view.

DETAILED DESCRIPTION OF THE PREFERRED EMBODIMENTS

An embodiment of the present invention will now be described hereinafter in detail with reference to the drawings. In the following embodiment, identical or common components are identically denoted in the figures and will not be described repeatedly. Further, in the figures, L represents a lengthwise direction of a later-described insulating resin body and corresponding to a first direction, T represents a heightwise direction of the insulating resin body and corresponding to a second direction, and W represents a widthwise direction of the insulating resin body and corresponding to a third direction. The second direction is orthogonal to the first direction, and the third direction is orthogonal to the first direction and the second direction.

Figure 1:
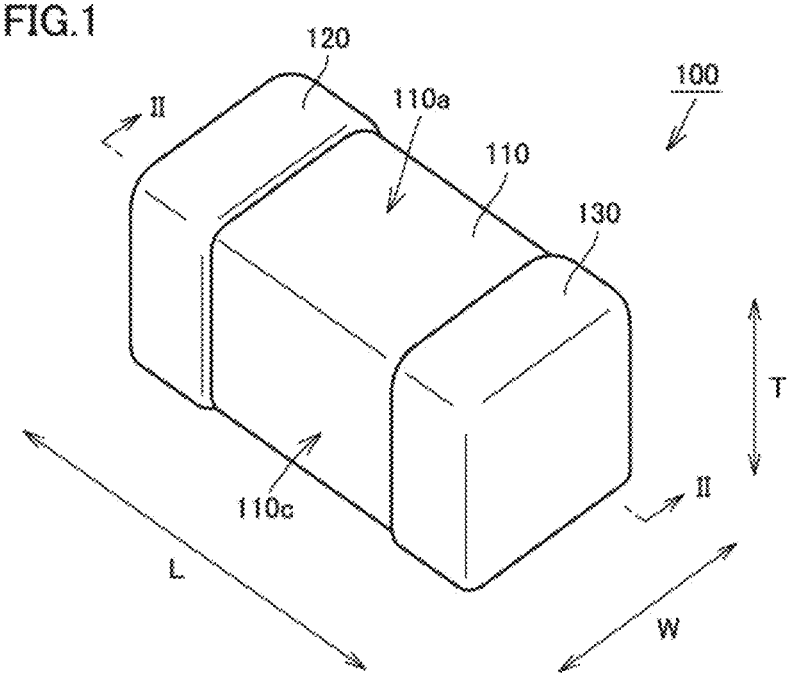
FIG. 1 is a perspective view of a solid electrolytic capacitor according to an embodiment.
Figure 2:
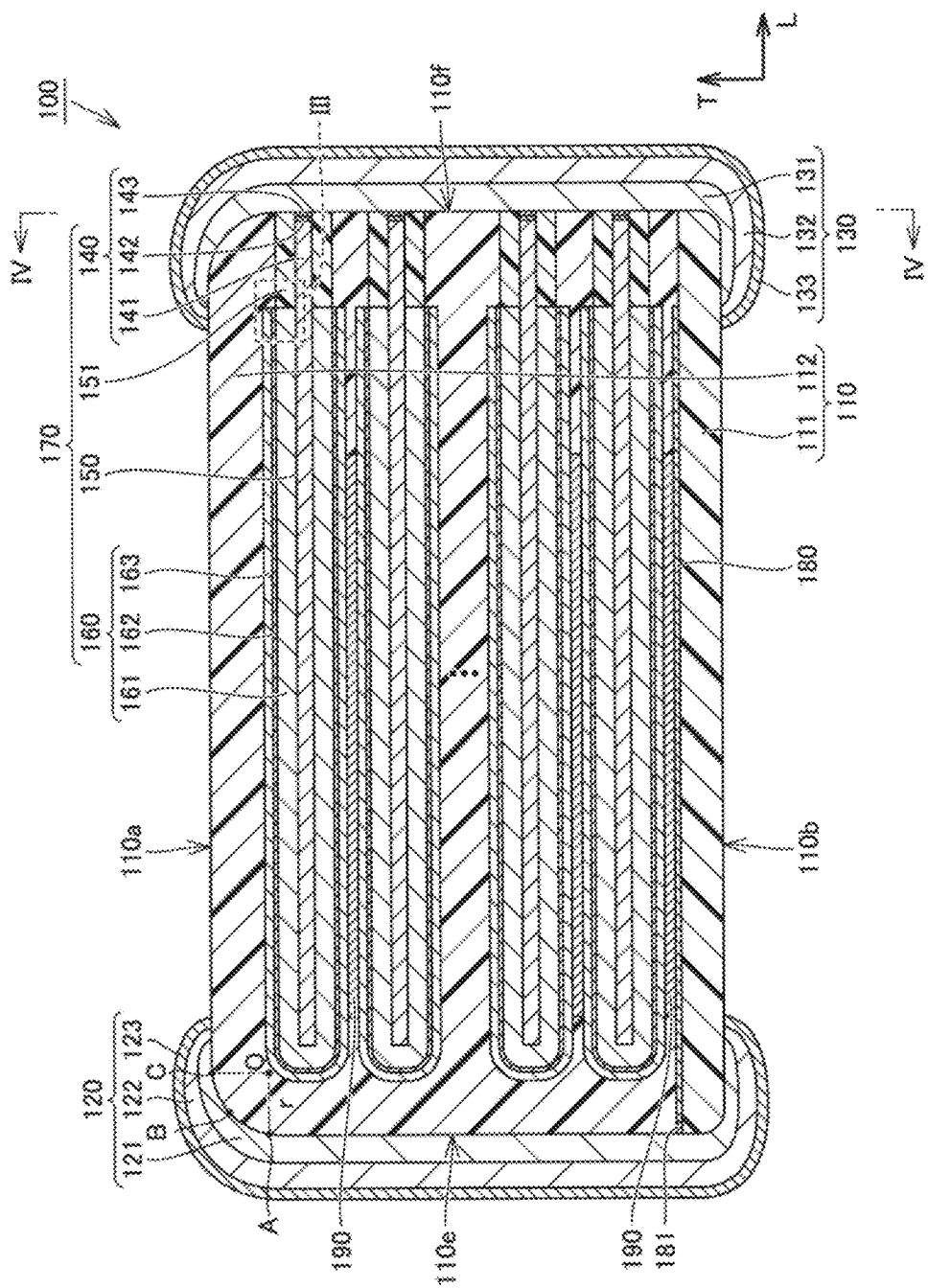
FIG. 2 is a cross-sectional view of the solid electrolytic capacitor taken along a line II-II shown in FIG. 1.
Figure 3:
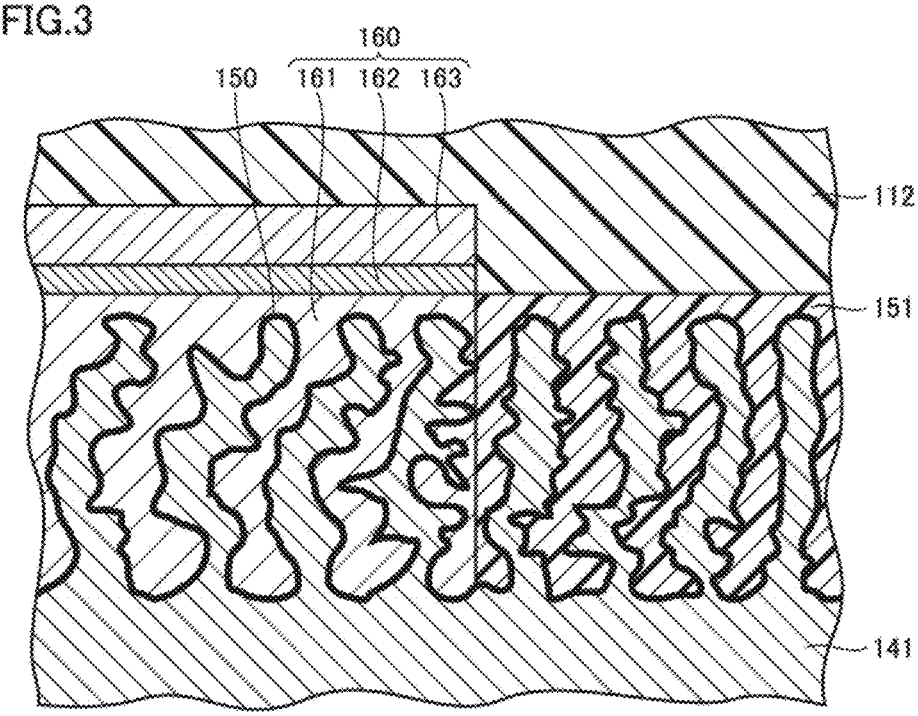
FIG. 3 is an enlarged cross-sectional view of a portion III shown in FIG. 2.
Figure 4:
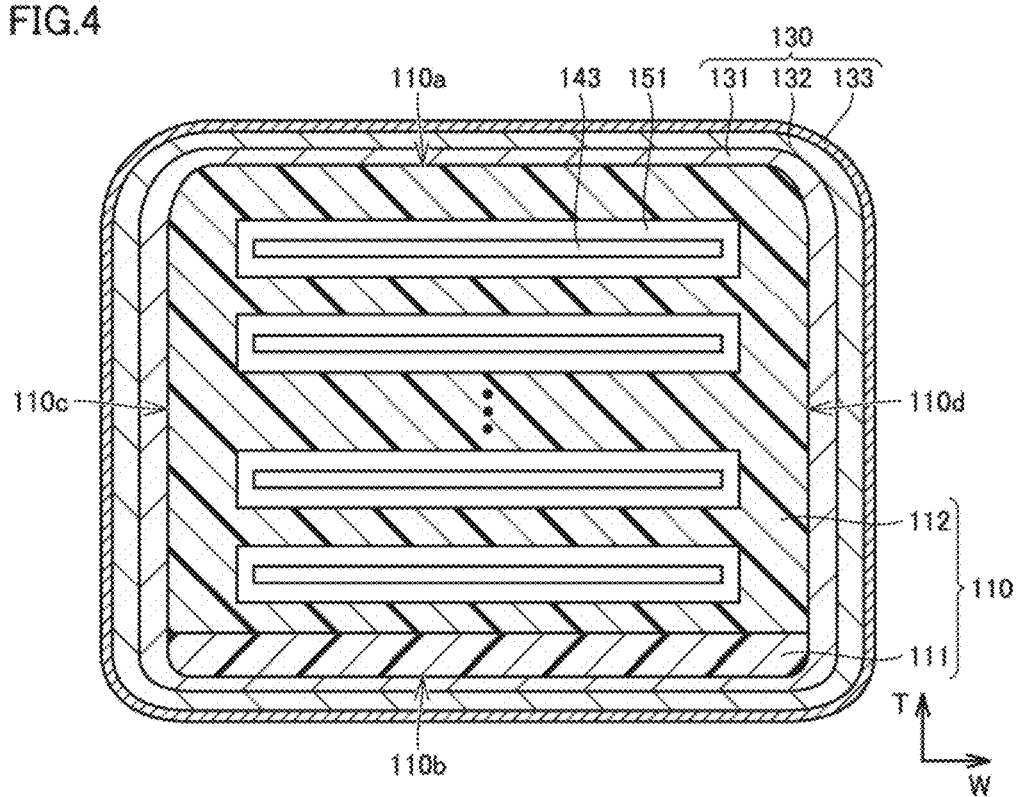
FIG. 4 is a cross-sectional view taken along a line IV-IV shown in FIG. 2.

FIG. 1 is a perspective view of a solid electrolytic capacitor according to an embodiment. FIG. 2 is a cross-sectional view of the solid electrolytic capacitor taken along a line II-II shown in FIG. 1. FIG. 3 is an enlarged cross-sectional view of a portion III shown in FIG. 2. FIG. 4 is a cross-sectional view of the solid electrolytic capacitor taken along a line IV-IV shown in FIG. 2. With reference to FIG. 1 to FIG. 4, a solid electrolytic capacitor 100 according to the embodiment will be described.

As shown in FIG. 1 to FIG. 4, solid electrolytic capacitor 100 according to the embodiment has a generally rectangular parallelepiped external shape. Solid electrolytic capacitor 100 has external dimensions for example of 3.5 mm in lengthwise direction L, 2.8 mm in widthwise direction W, and 1.9 mm in heightwise direction T.

Solid electrolytic capacitor 100 includes a plurality of capacitor elements 170, a leading conductor layer 180, an insulating resin body 110, a first external electrode 120, and a second external electrode 130. While in the embodiment shown, solid electrolytic capacitor 100 includes a plurality of capacitor elements 170, the present invention is not limited thereto, and solid electrolytic capacitor 100 may include at least one capacitor element 170.

In insulating resin body 110, the plurality of capacitor elements 170 and leading conductor layer 180 are buried. Insulating resin body 110 has a generally rectangular parallelepiped external shape. Insulating resin body 110 has a first main surface 110a and a second main surface 110b opposite to each other in heightwise direction T, a first side surface 110c and a second side surface 110d opposite to each other in widthwise direction W, and a first end surface 110e and a second end surface 110f opposite to each other in lengthwise direction L.

Insulating resin body 110 has a generally rectangular parallelepiped external shape, as described above, with corners and ridges thereof rounded. A corner is a portion where three surfaces of insulating resin body 110 meet one another, and a ridge is a portion where two surfaces of insulating resin body 110 meet each other. The shape of insulating resin body 110 will more specifically be described later with reference to FIGS. 5 to 7.

At least one of first main surface 110a, second main surface 110b, first side surface 110c, second side surface 110d, first end surface 110e, and second end surface 110f may have a recess and a projection.

Insulating resin body 110 is composed of a substrate 111 serving as a second insulating resin portion, and a mold portion 112 serving as a first insulating resin portion provided on substrate 111.

Substrate 111 is, for example, a glass epoxy substrate, and is made of a composite material such as FRP (Fiber Reinforced Plastics). A surface of substrate 111 facing outward defines second main surface 110b of insulating resin body 110. As a material constituting substrate 111, a composite material containing a woven fabric or a nonwoven fabric composed of carbon, glass, silica or the like in an insulating resin such as an epoxy resin can be used. Substrate 111 is, for example, 100 μm in thickness.

Mold portion 112 is made of an insulating resin such as epoxy resin in which glass or an oxide of Si is dispersed and mixed as a filler. Mold portion 112 is provided on substrate 111 so as to cover the plurality of capacitor elements 170 and leading conductor layer 180. A surface of mold portion 112 located on a side opposite to a side on which substrate 111 is located defines first main surface 110a of insulating resin body 110.

A plurality of conductive particles are present in each of first end surface 110e and second end surface 110f of insulating resin body 110. The conductive particles contain Pd. When forming a first external electrode 120 and a second external electrode 130, which will be described later, the conductive particles act as a catalytic metal serving as a core for plating. First end surface 110e and second end surface 110f of insulating resin body 110 preferably have a surface roughness (Ra) of 2.2 μm or more and 8.3 μm or less.

The plurality of capacitor elements 170 each include an anode portion 140, a dielectric layer 150, and a cathode portion 160. Anode portion 140 is composed of a metal layer 141 extending in lengthwise direction L. In the embodiment, anode portion 140 includes a first plating film 142 and a second plating film 143 provided at metal layer 141.

Metal layer 141 has an external surface provided with a plurality of recesses. The external surface of metal layer 141 is porous. Since the external surface of metal layer 141 is porous, metal layer 141 has an increased surface area. Note that metal layer 141 is not limited to having both a front surface and a back surface porously, and instead may have only one of the front surface and the back surface porously. For example, only the back surface of metal layer 141 on a side facing second main surface 110b of insulating resin body 110 may be porous.

Metal layer 141 contains Al. Metal layer 141 is made of, for example, an aluminum foil having a porous external surface.

An end surface of metal layer 141 closer to second end surface 110f is covered with first plating film 142. First plating film 142 is covered with second plating film 143. First plating film 142 contains Zn. Second plating film 143 contains Ni. Note that first plating film 142 and second plating film 143 may be dispensed with.

Dielectric layer 150 is provided on an external surface of metal layer 141. Dielectric layer 150 is composed for example of an oxide of Al. Specifically, dielectric layer 150 is made of an oxide of Al formed by oxidizing an external surface of metal layer 141.

Cathode portion 160 has a solid electrolyte layer 161 and a current collector layer. Solid electrolyte layer 161 is provided on a portion of an external surface of dielectric layer 150. Solid electrolyte layer 161 is not provided on an external surface of dielectric layer 150 located on a side opposite to that of cathode portion 160 and provided on an external surface of metal layer 141 closer to second end surface 110f. The external surface of dielectric layer 150 of this portion is covered with an insulating resin layer 151 described later.

As shown in FIG. 3, solid electrolyte layer 161 is provided to fill the plurality of recesses of metal layer 141. Note, however, that solid electrolyte layer 161 covering the above described portion of the external surface of dielectric layer 150 suffices, and metal layer 141 may have a recess which is not filled with solid electrolyte layer 161. Solid electrolyte layer 161 is made of a polymer containing a conductive polymer such as poly (3,4-ethylenedioxythiophene), for example.

The current collector layer is provided on an external surface of solid electrolyte layer 161. The current collector layer is composed of a first current collector layer 162 provided on an external surface of solid electrolyte layer 161 and a second current collector layer 163 provided on an external surface of first current collector layer 162. First current collector layer 162 contains C. Second current collector layer 163 contains Ag.

Note that the current collector layer may not include second current collector layer 163. When the current collector layer includes second current collector layer 163, second current collector layer 163 may include at least one type of metal other than Ag, such as Al, Cu and Ni, and Ag. Alternatively, the current collector layer may be composed of first current collector layer 162, second current collector layer 163, and a third current collector layer provided on an external surface of second current collector layer 163. In that case, second current collector layer 163 and the third current collector layer each include at least one type of metal other than Ag, such as Al, Cu and Ni, and Ag.

Of the layers constituting the current collector layer, a layer other than first current collector layer 162 at least is composed of a paste containing the above metals. As a base material composing the paste, thermosetting resin, thermoplastic resin, elastomer or the like can be used. As the thermosetting resin, epoxy resin, polyimide resin or the like can be used. As the thermoplastic resin, acrylic resin, polyethylene resin, polypropylene resin, Teflon (registered trademark) resin or the like can be used. As the elastomer, a material having rubbery elasticity such as natural rubber, synthetic rubber, silicon rubber, fluorine rubber, polyurethane resin, polyester resin or the like can be used. The above base material may be a mixture of a plurality of types of materials. First current collector layer 162 may be composed of the above paste containing C or may be composed of graphite.

When each layer composing the current collector layer is composed of a paste with thermoplastic resin or elastomer serving as a base material, an impact, mechanical stress, and stress caused by a difference in coefficient of thermal expansion between materials, that act in a production process and at a time of formation before mold portion 112 is formed, can be relieved and dielectric layer 150 can be prevented from cracking, and thus an increase of a leakage current of the solid electrolytic capacitor can be prevented.

When a case in which each layer composing the current collector layer is composed of a paste with thermosetting resin serving as a base material is compared with a case in which each layer composing the current collector layer is composed of a paste with thermoplastic resin or elastomer serving as a base material, the former tends to provide a solid electrolytic capacitor providing a larger leakage current than the latter, however, the former can suppress deterioration in ESR of the solid electrolytic capacitor attributed to its thermal hysteresis. For example, when first current collector layer 162 may be composed of a paste with thermoplastic resin or elastomer serving as a base material, and second current collector layer 163 may be composed of a paste with thermosetting resin serving as a base material. Which base material for each layer composing the current collector layer is combined with another can be selected as appropriate.

As has been described above, an external surface of dielectric layer 150 located on a side opposite to that of cathode portion 160 and free of solid electrolyte layer 161, and provided on an external surface of metal layer 141 closer to second end surface 110f, is covered with insulating resin layer 151.

As shown in FIG. 3, insulating resin layer 151 is provided so as to fill a plurality of recess portions of an external surface of metal layer 141 closer to second end surface 110f. Insulating resin layer 151 contains an insulating resin such as polyimide resin or polyamide imide resin.

A length of insulating resin layer 151 in lengthwise direction L is preferably equal to or greater than a length of insulating resin body 110 in lengthwise direction L multiplied by 0.025 and equal to or less than the length of insulating resin body 110 in lengthwise direction L multiplied by 0.5. This can maintain an electrostatic capacity of solid electrolytic capacitor 100 and reduce ESR thereof while ensuring reliability thereof.

When the length of insulating resin layer 151 is smaller than the length of insulating resin body 110 multiplied by 0.025, then, in a production process described later (at step S10) when an end surface of metal layer 141 exposed at an end surface of a chip is plated with a plating solution the plating solution may penetrate into insulating resin body 110 along an external surface of dielectric layer 150 and cause a short circuit. In contrast, when the length of insulating resin layer 151 is larger than the length of insulating resin body 110 multiplied by 0.5, the solid electrolytic capacitor may have a reduced electrostatic capacity and also have an increased ESR.

Insulating resin layer 151 is preferably 5 μm or more and 30 μm or less in thickness. This can maintain an electrostatic capacity of solid electrolytic capacitor 100 and reduce ESR thereof while ensuring reliability thereof.

When the thickness of insulating resin layer 151 is smaller than 5 μm, then, in the production process described later (at step S10) when the end surface of metal layer 141 exposed at the end surface of the chip is plated with a plating solution the plating solution may not be effectively prevented from penetrating into insulating resin body 110 along an external surface of dielectric layer 150. In contrast, when the thickness of insulating resin layer 151 is larger than 30 μm, then, in stacking a plurality of capacitor elements, adjacent capacitor elements have their current collector layers connected unstably, and the solid electrolytic capacitor may be impaired in reliability.

As shown in FIG. 2, the plurality of capacitor elements 170 are stacked in heightwise direction T. Mutually adjacent capacitor elements 170 have their respective current collector layers connected to each other by a connecting conductor layer 190. A width of connecting conductor layer 190 in widthwise direction W is equivalent to a width of metal layer 141 in widthwise direction W. Connecting conductor layer 190 contains Ag.

Leading conductor layer 180 is provided on substrate 111, which is a portion of insulating resin body 110. Leading conductor layer 180 is positioned inside insulating resin body 110 closer to second main surface 110b.

A width of leading conductor layer 180 in widthwise direction W is equivalent to a width of metal layer 141 in widthwise direction W. A length of leading conductor layer 180 in lengthwise direction L is preferably equal to or greater than the length of insulating resin body 110 in lengthwise direction L multiplied by 0.3 and equal to or less than the length of insulating resin body 110 in lengthwise direction L multiplied by 0.8. This can reduce the solid electrolytic capacitor's ESR while ensuring that the solid electrolytic capacitor is reliable.

When a length of leading conductor layer 180 in lengthwise direction L is less than the length of insulating resin body 110 in lengthwise direction L multiplied by 0.3, the solid electrolytic capacitor would have an ESR higher than 30 mΩ. In contrast, when the length of leading conductor layer 180 in lengthwise direction L is larger than the length of insulating resin body 110 in lengthwise direction L multiplied by 0.8, a short circuit may be caused between leading conductor layer 180 and second external electrode 130, and the solid electrolytic capacitor is impaired in reliability.

Leading conductor layer 180 is preferably 10 μm or more and 100 μm or less in thickness. This can reduce solid electrolytic capacitor 100's ESR while miniaturizing solid electrolytic capacitor 100. When the thickness of leading conductor layer 180 is less than 10 μm, the solid electrolytic capacitor has an ESR higher than 30 mΩ. When the thickness of leading conductor layer 180 is larger than 100 μm, the solid electrolytic capacitor is prevented from being miniaturized.

The distance in lengthwise direction L between a position closest to first end surface 110e at a portion where leading conductor layer 180 and connecting conductor layer 190 are connected together and first end surface 110e is preferably 87.5 μm or more and 1750 μm or less. This can minimize solid electrolytic capacitor 100 while ensuring that the solid electrolytic capacitor is reliable.

When the above distance is less than 87.5 μm, then, in the production process described later (at step S10) when the plating solution used to plate an end surface of metal layer 141 penetrates along an external surface of leading conductor layer 180, the plating solution may reach a capacitor element, and impair the solid electrolytic capacitor in reliability. When the above distance is larger than 1750 μm, the solid electrolytic capacitor is prevented from being miniaturized.

Leading conductor layer 180 contains Cu. In the embodiment, an end surface of leading conductor layer 180 closer to first end surface 110e is covered with a third plating film 181. Third plating film 181 contains Ni. Note that third plating film 181 may be dispensed with.

Leading conductor layer 180 is connected to the current collector layer of one of the plurality of capacitor elements 170. Specifically, among the plurality of capacitor elements 170, a capacitor element 170 positioned on the side of one end closer to second main surface 110b in heightwise direction T is adjacent to leading conductor layer 180. The current collector layer of only capacitor element 170 adjacent to leading conductor layer 180 is connected to leading conductor layer 180 by connecting conductor layer 190.

First external electrode 120 extends from first end surface 110e of insulating resin body 110 to first main surface 110a, second main surface 110b, first side surface 110c, and second side surface 110d thereof. First external electrode 120 is electrically connected to cathode portion 160 of each of the plurality of capacitor elements 170 via leading conductor layer 180.

First external electrode 120 is composed of at least one plating layer provided on first end surface 110e of insulating resin body 110. Specifically, first external electrode 120 is composed of a first plating layer 121 provided on first end surface 110e of insulating resin body 110, a second plating layer 122 provided on first plating layer 121, and a third plating layer 123 provided on second plating layer 122. First plating layer 121 contains Cu. Second plating layer 122 contains Ni. Third plating layer 123 contains Sn.

First external electrode 120 is directly or indirectly connected to leading conductor layer 180 at first end surface 110e of insulating resin body 110. In the present embodiment, first external electrode 120 is connected to leading conductor layer 180 with third plating film 181 interposed therebetween. That is, third plating film 181 is provided between first external electrode 120 and leading conductor layer 180.

Second external electrode 130 extends from second end surface 110f of insulating resin body 110 to first main surface 110a, second main surface 110b, first side surface 110c, and second side surface 110d. Second external electrode 130 is electrically connected to anode portion 140 of each of the plurality of capacitor elements 170.

Second external electrode 130 is composed of at least one plating layer provided on second end surface 110f of insulating resin body 110. Specifically, second external electrode 130 is composed of a first plating layer 131 provided on second end surface 110f of insulating resin body 110, a second plating layer 132 provided on first plating layer 131, and a third plating layer 133 provided on second plating layer 132. First plating layer 131 contains Cu. Second plating layer 132 contains Ni. Third plating layer 133 contains Sn.

Second external electrode 130 is directly or indirectly connected to metal layer 141 of each of the plurality of capacitor elements 170 at second end surface 110f of insulating resin body 110. Second external electrode 130 is connected to metal layer 141 of each of the plurality of capacitor elements 170 with first plating film 142 and second plating film 143 interposed therebetween. That is, first plating film 142 and second plating film 143 are provided between metal layer 141 of each of the plurality of capacitor elements 170 and second external electrode 130.

Figure 5:
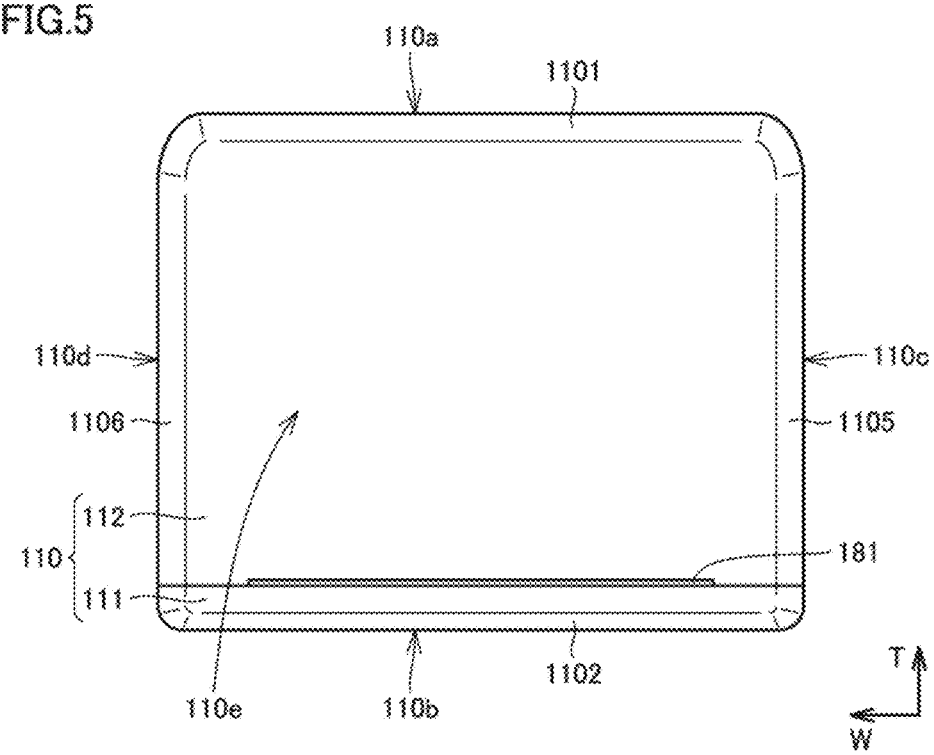
FIG. 5 is a front view of a first end surface of a solid electrolytic capacitor according to the embodiment.
Figure 6:
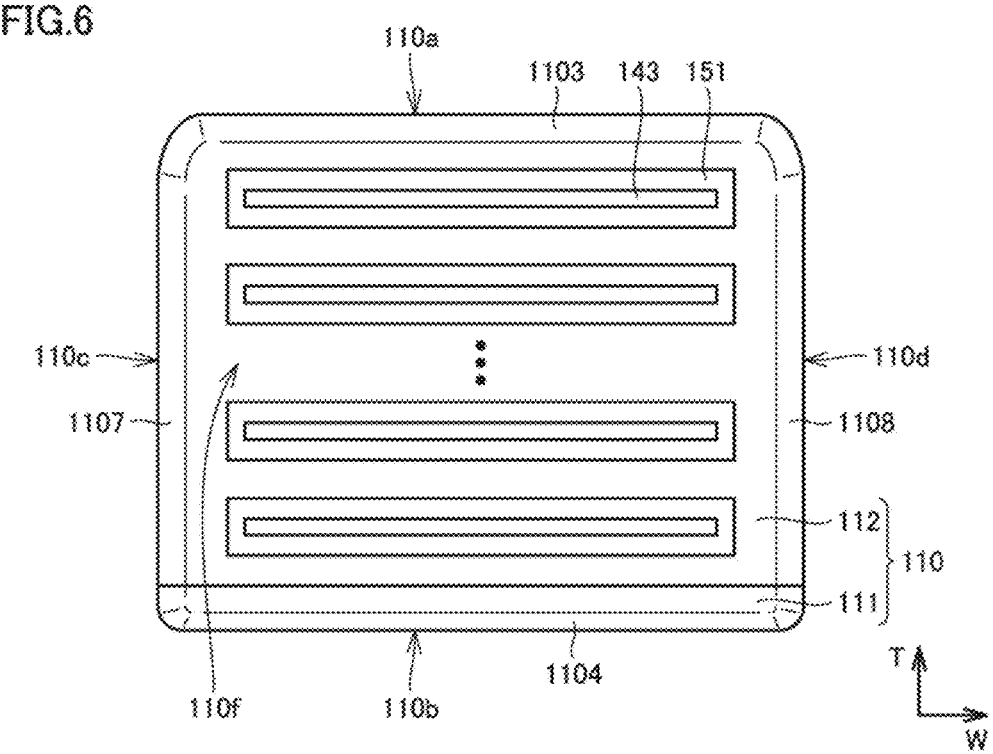
FIG. 6 is a front view of a second end surface of the solid electrolytic capacitor according to the embodiment.
Figure 7:
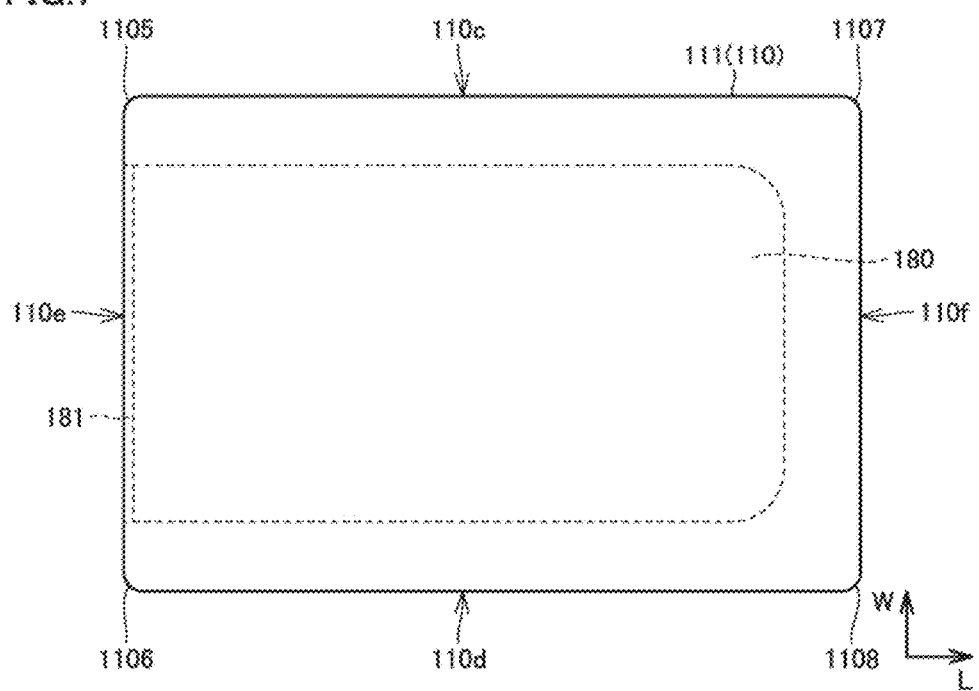
FIG. 7 is a bottom view of the solid electrolytic capacitor according to the embodiment.

FIG. 5 is a front view of a first end surface of a solid electrolytic capacitor according to the embodiment. FIG. 6 is a front view of a second end surface of the solid electrolytic capacitor according to the embodiment. FIG. 7 is a bottom view of the solid electrolytic capacitor according to the embodiment. Note that in FIG. 7 leading conductor layer 180 is indicated by a broken line. A shape of insulating resin body 110 included in solid electrolytic capacitor 100 will be described with reference to FIGS. 5 to 7.

As shown in FIGS. 5 to 7, insulating resin body 110 includes a first connecting portion 1101 connecting first end surface 110e and first main surface 110a, a second connecting portion 1102 connecting first end surface 110e and second main surface 110b, a third connecting portion 1103 connecting second end surface 110f and first main surface 110a, and a fourth connecting portion 1104 connecting second end surface 110f and second main surface 110b.

Insulating resin body 110 includes a fifth connecting portion 1105 connecting first end surface 110e and first side surface 110c, a sixth connecting portion 1106 connecting first end surface 110e and second side surface 110d, a seventh connecting portion 1107 connecting second end surface 110f and first side surface 110c, and an eighth connecting portion 1108 connecting second end surface 110*f* and second side surface 110*d*.

First connecting portion 1101 and third connecting portion 1103 are provided at mold portion 112. Second connecting portion 1102 and fourth connecting portion 1104 are provided at substrate 111.

First connecting portion 1101, second connecting portion 1102, third connecting portion 1103, and fourth connecting portion 1104 each have a first chamfered portion. Preferably, the first chamfered portion extends from the side of first side surface 110*c* to the side of second side surface 110*d*. Note that when first end surface 110*e* and first and second main surfaces 110*a* and 110*b* partially meet one another, first connecting portion 1101 and second connecting portion 1102 include a ridge between first end surface 110*e* and first and second main surfaces 110*a* and 110*b*. When second end surface 110*f* and first and second main surfaces 110*a* and 110*b* partially meet one another, third connecting portion 1103 and fourth connecting portion 1104 include a ridge between second end surface 110*f* and first and second main surfaces 110*a* and 110*b*.

As shown in FIG. 2, first chamfered portion has a curved shape in a cross-sectional view as seen in widthwise direction W. More specifically, the first chamfered portion has a generally arcuate shape.

Herein, as shown in FIG. 2, assuming that the first chamfered portion has a radius of curvature r, a point on a circle having the radius of curvature r with a center of curvature O has coordinates represented as (x, y), and the center of curvature O has coordinates of (a, b), a circle having the radius of curvature r with the center of curvature O can be expressed by the following expression (1):

$$(x-a)^2+(y-b)^2=r^2 \quad \text{Expression (1)}.$$

By substituting each of the coordinates of arbitrary three points on the circle at first connecting portion 1101 (for example, points A, B and C shown in FIG. 2) into the above expression (1), and solving these as a simultaneous equation, the radius of curvature r and the coordinates (a, b) of the center of curvature can be calculated.

Note that the coordinates of points A, B and C can be measured as follows: insulating resin body 110 is polished to a position of about ½ of a dimension thereof in widthwise direction W to expose a cross section along lengthwise direction L and heightwise direction T, and the cross section is imaged using a scanning electron microscope (SEM) or the like. It is preferable to set an average value of radii of curvature obtained from five capacitor elements as the radius of curvature r of solid electrolytic capacitor 100.

Substrate 111 serving as the second insulating resin portion is harder than mold portion 112 serving as the first insulating resin portion, and the first chamfered portions of first connecting portion 1101 and third connecting portion 1103 are rounder than the first chamfered portions of second connecting portion 1102 and fourth connecting portion 1104. More specifically, the first chamfered portion at first connecting portion 1101 and third connecting portion 1103 has a radius of curvature larger than that of the first chamfered portion at second connecting portion 1102 and fourth connecting portion 1104.

Note that while a case has been described by way of example in which due to a difference in hardness between mold portion 112 and substrate 111 the first chamfered portion at first connecting portion 1101 and third connecting portion 1103 has a radius of curvature larger than that of the first chamfered portion at second connecting portion 1102 and fourth connecting portion 1104, this is not exclusive, and regardless of a difference in hardness, the first chamfered portion may have a radius of curvature larger than that of the first chamfered portion at second connecting portion 1102 and fourth connecting portion 1104. For example, even when insulating resin body 110 is composed only of the mold portion, the first chamfered portion may have a radius of curvature larger than that of the first chamfered portion at second connecting portion 1102 and fourth connecting portion 1104.

Note that the first chamfered portion when seen in widthwise direction W is not limited to a curved shape and may instead be a bent shape. In that case, when seen in widthwise direction W, a cross section along lengthwise direction L and heightwise direction T has a polygonal shape in which each interior angle is 90 degrees or more.

Furthermore, fifth connecting portion 1105, sixth connecting portion 1106, seventh connecting portion 1107, and eighth connecting portion 1108 each have a second chamfered portion. The second chamfered portion has a curved shape in a cross-sectional view as seen in heightwise direction T, as shown in FIG. 4. More specifically, the second chamfered portion has a generally arcuate shape.

The radius of curvature of the second chamfered portion can also be measured by the same method as the radius of curvature of the first chamfered portion is measured. In that case, for the measurement, insulating resin body 110 is polished to a position of about ½ of a dimension thereof in heightwise direction T to expose a cross section along lengthwise direction L and widthwise direction W.

The second chamfered portion when seen in heightwise direction T is not limited to a curved shape and may instead be a bent shape. In this case, when seen in the second direction, a cross section along lengthwise direction L and widthwise direction W has a polygonal shape in which each interior angle is 90 degrees or more.

First external electrode 120 extends from first end surface 110*e* across first connecting portion 1101, second connecting portion 1102, fifth connecting portion 1105, and sixth connecting portion 1106 to first and second main surfaces 110*a* and 110*b* and first and second side surfaces 110*c* and 110*d*. That is, first external electrode 120 is disposed along the first chamfered portion provided at first connecting portion 1101 and second connecting portion 1102, and the second chamfered portion provided at fifth connecting portion 1105 and sixth connecting portion 1106.

As first external electrode 120 is along the first chamfered portion and the second chamfered portion, a stress acting on first external electrode 120 at a boundary between first end surface 110*e* and first and second main surfaces 110*a* and 110*b* can be relieved, and adhesion of first external electrode 120 to a surface of insulating resin body 110 on the side of first end surface 110*e* can be improved. This can increase adhesion strength of first external electrode 120 and suppress peeling of first external electrode 120 off insulating resin body 110 at the time of formation or after production. As a result, solid electrolytic capacitor 100 can be improved in reliability.

Second external electrode 130 extends from second end surface 110*f* across third connecting portion 1103, fourth connecting portion 1104, seventh connecting portion 1107, and eighth connecting portion 1108 to first and second main surfaces 110*a* and 110*b* and first and second side surfaces 110*c* and 110*d*. That is, second external electrode 130 is disposed along the first chamfered portion provided at third connecting portion 1103 and fourth connecting portion 1104, and the second chamfered portion provided at seventh connecting portion 1107 and eighth connecting portion 1108.

As second external electrode 130 is along the first chamfered portion and the second chamfered portion, a stress acting on second external electrode 130 at a boundary between second end surface 110*f* and first and second main surfaces 110*a* and 110*b* can be relieved, and adhesion of second external electrode 130 to a surface of insulating resin body 110 on the side of second end surface 110*f* can be improved. This can increase adhesion strength of second external electrode 130 and suppress peeling of second external electrode 130 off insulating resin body 110 at the time of formation or after production. As a result, solid electrolytic capacitor 100 can be improved in reliability.

Furthermore, first end surface 110*e* and second end surface 110*f* of insulating resin body 110 preferably have a surface roughness (Ra) of 2.2 µm or more and 8.3 µm or less. This can improve overall adhesion of first external electrode 120 and second external electrode 130 to first end surface 110*e* and second end surface 110*f*.

First end surface 110*e* and second end surface 110*f* of insulating resin body 110 each have a rough surface and have fine recesses and projections. First plating layers 121 and 131 containing Cu are each formed so as to enter these fine recesses and projections and their adhesion to insulating resin body 110 is enhanced by an anchor effect. This can also suppress peeling of first and second external electrodes 120 and 130 off insulating resin body 110.

When solid electrolytic capacitor 100 is mounted on a mounting substrate by using a bonding member such as solder, a tensile force from the bonding member acts more on the side of the main surface of the insulating resin body located farther from the mounting substrate than on the side of the main surface of the insulating resin body located closer to the mounting substrate.

Here, as has been described above, with the first chamfered portions at first connecting portion 1101 and third connecting portion 1103 being rounder than the first chamfered portions at second connecting portion 1102 and fourth connecting portion 1104 located closer to substrate 111, when the substrate 111 side is mounted on the mounting substrate, the first chamfered portions at first connecting portion 1101 and third connecting portion 1103 that are rounder can significantly alleviate the tensile force exerted from the bonding member. This can suppress cracking caused by reflow or the like, and ensure mountability and electrical characteristics at the time of mounting. As a result, solid electrolytic capacitor 100 can be improved in reliability.

(Method of Producing Solid Electrolytic Capacitor)

Figure 8:
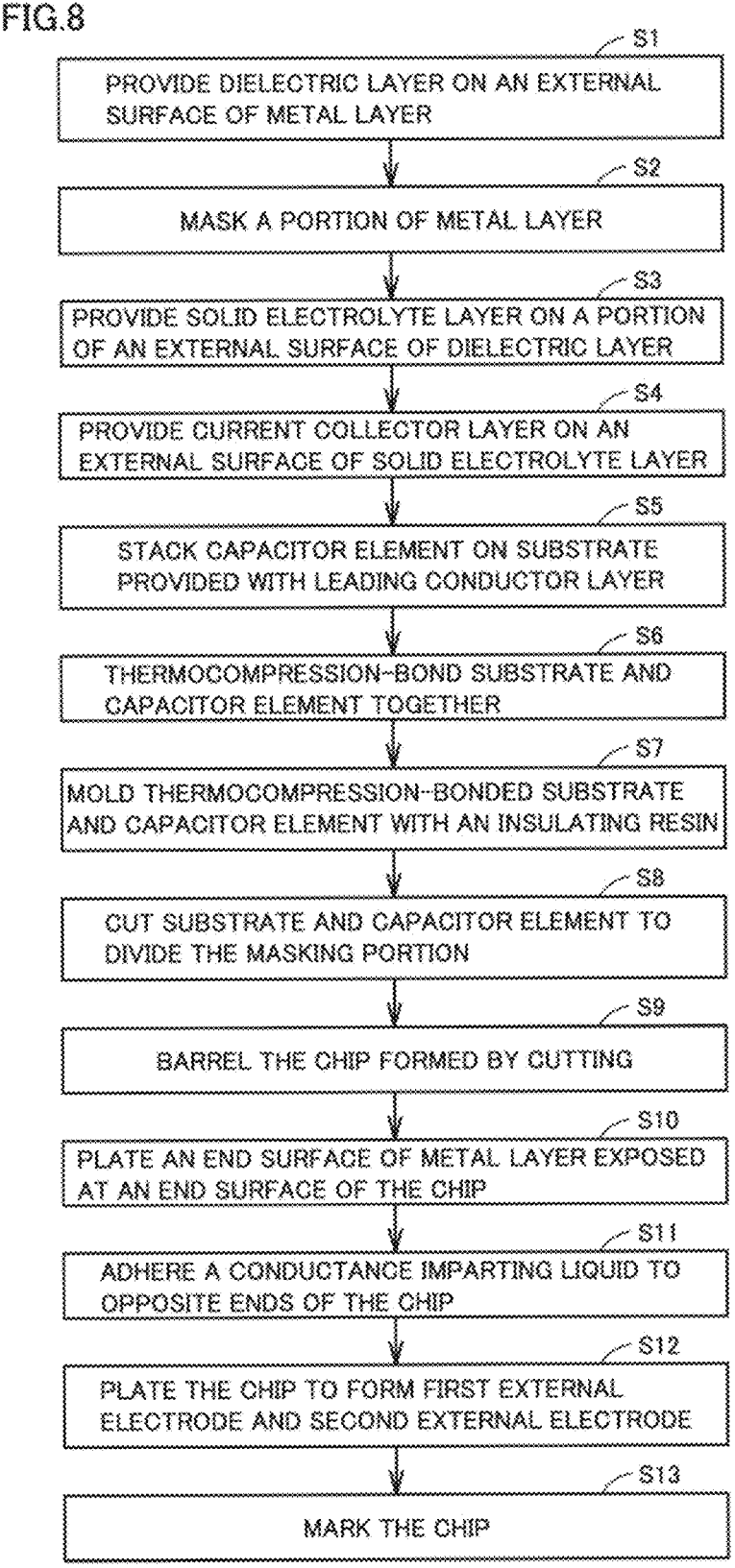
FIG. 8 is a flowchart of producing a solid electrolytic capacitor according to the embodiment.

FIG. 8 is a flowchart of producing a solid electrolytic capacitor according to the embodiment. A method of producing solid electrolytic capacitor 100 according to the embodiment will be described with reference to FIG. 8.

As shown in FIG. 8, in producing solid electrolytic capacitor 100 according to an embodiment of the present invention, initially, dielectric layer 150 is provided on an external surface of metal layer 141 (step S1). In the present embodiment, an aluminum foil serving as metal layer 141 is immersed in an aqueous solution of ammonium adipate and oxidized to produce an oxide of Al to serve as dielectric layer 150. Note than when an aluminum foil in which an oxide of Al has already been formed is cut and used as metal layer 141, then, in order to form an oxide of Al on the cut surface, metal layer 141 having been cut is again immersed in an aqueous solution of ammonium adipate and oxidized.

Subsequently, a portion of metal layer 141 is masked (step S2). This masking is performed to define a region in which solid electrolyte layer 161 is formed in a subsequent step. Specifically, a masking agent made of an insulating resin such as polyimide resin or polyamide-imide resin is applied to a portion of an external surface of metal layer 141. A portion of a masking portion formed in this step serves as insulating resin layer 151.

Subsequently, solid electrolyte layer 161 is provided on a portion of an external surface of dielectric layer 150 (step S3). More specifically, solid electrolyte layer 161 is formed by adhering a solid electrolyte dispersion solution to an external surface of dielectric layer 150 located in the region in which solid electrolyte layer 161 is formed as defined by the masking portion formed in step S2.

Subsequently, a current collector layer is provided on an external surface of solid electrolyte layer 161 (step S4). Specifically, first current collector layer 162 is formed by applying C to an external surface of solid electrolyte layer 161. Second current collector layer 163 is formed by applying Ag to an external surface of first current collector layer 162.

Second current collector layer 163 may not be formed. Second current collector layer 163 may include at least one type of metal other than Ag, such as Al, Cu and Ni, and Ag. Alternatively, a third current collector layer may be further formed on an external surface of second current collector layer 163. In that case, second current collector layer 163 and the third current collector layer each include at least one type of metal other than Ag, such as Al, Cu and Ni, and Ag.

When each layer composing the current collector layer is composed of a paste containing the above metals, each layer is formed by applying the paste. When the paste includes a base material of thermosetting resin or thermosetting elastomer, then, after the paste is applied, the paste is heated and thus thermally set. When first current collector layer 162 is composed of graphite, first current collector layer 162 is formed by applying graphite.

Subsequently, capacitor element 170 is stacked on substrate 111 provided with leading conductor layer 180 (step S5). Specifically, the current collector layer of capacitor element 170 and leading conductor layer 180 are connected by a conductive adhesive such as an Ag paste, and the current collector layers of mutually adjacent capacitor elements 170 are connected.

Subsequently, substrate 111 and capacitor element 170 are thermocompression-bonded (step S6). The conductive adhesive are heated and cured and thus becomes connecting conductor layer 190.

Subsequently, substrate 111 and capacitor element 170 thermocompression-bonded together are molded with an insulating resin (step S7). More specifically, a molding method is employed: substrate 111 is attached on an upper half die, and in a condition in which an insulating resin such as epoxy resin in which glass or an oxide of Si is dispersed and mixed as a filler is heated and melted in a cavity of a lower half die, the upper and lower half dies are clamped together and the insulating resin is solidified to form mold portion 112.

Subsequently, substrate 111 and capacitor element 170 are cut so as to divide the masking portion formed in step S2 (step S8). Specifically, substrate 111 and capacitor element 170 in a molded state are cut by pressing, dicing or laser cutting. Through this step, a chip including insulating resin body 110 is formed.

Subsequently, the chip is barreled (step S9). Specifically, the chip is enclosed together with a polishing material in a small box called a barrel, and the chip is polished by rotating the barrel. As a result, the chip has corners and ridges rounded.

More specifically, by barreling, first connecting portion 1101 connecting first end surface 110e and first main surface 110a together, second connecting portion 1102 connecting first end surface 110e and second main surface 110b together, third connecting portion 1103 connecting second end surface 110f and first main surface 110a together, and a fourth connecting portion 1104 connecting second end surface 110f and second main surface 110b together are provided with the above described first chamfered portion. Furthermore, fifth connecting portion 1105 connecting first end surface 110e and first side surface 110c, sixth connecting portion 1106 connecting first end surface 110e and second side surface 110d, seventh connecting portion 1107 connecting second end surface 110f and first side surface 110c, and eighth connecting portion 1108 connecting second end surface 110f and second side surface 110d are provided with the above described second chamfered portion.

Subsequently, an end surface of metal layer 141 exposed at an end surface of the chip is plated (step S10). Specifically, the chip's oil content is removed with an alkali treatment agent. Alkali etching is performed to remove an oxide film on an end surface of metal layer 141. By a smut removing step, a smut on an end surface of metal layer 141 is removed. Zn is displaced and deposited by a zincate treatment to form first plating film 142 on an end surface of metal layer 141. By an electroless Ni plating treatment, second plating film 143 is formed on first plating film 142. In doing so, third plating film 181 is formed on an end surface of leading conductor layer 180.

Subsequently, a conductance imparting liquid is adhered to opposite ends of the chip (step S11). Specifically, a portion of the chip other than the opposite ends is masked. The chip is degreased with a surfactant in order to improve the conductance imparting liquid's wettability with respect to the surfaces of the opposite ends of the chip and also facilitate the conductive particles contained in the conductance imparting liquid to be adsorbed in the opposite ends of the chip. As a conditioner also having a degreasing power, a surfactant of any one of anion, cation, amphoteric ion and non-ion is selected and used depending on the type of the conductance imparting liquid.

Note that while the conductive particles contained in the conductance imparting liquid include Pd as a catalyst metal serving as a core of plating, this is not exclusive and they may contain at least one type of metal selected from the group consisting of Pd, Sn, Ag, and Cu. The conductance imparting liquid is a solution containing ions of the above metal or a colloidal solution of the above metal.

The chip having opposite ends with the conductance imparting liquid adhering thereto is washed with water or a solvent and then dried to form a conductive film on the opposite ends of the chip. Thus a plurality of conductive particles are present in each of first end surface 110e and second end surface 110f of insulating resin body 110.

Subsequently, the chip has the opposite ends plated to form first external electrode 120 and second external electrode 130 (step S12). Specifically, using a plating barrel apparatus, first plating layers 121 and 131 containing Cu are formed on the conductive films of the opposite ends of the chip by electrolytic plating. First plating layer 121 and first plating layer 131 are formed such that conductive particles adhering to the opposite ends of the chip are used as a core.

First plating layer 121 extends from first end surface 110e along the first and second chamfered portions to reach first and second main surfaces 110a and 110b and first and second side surfaces 110c and 110d.

First plating layer 131 extends from second end surface 110f along the first and second chamfered portions to reach first and second main surfaces 110a and 110b and first and second side surfaces 110c and 110d.

Subsequently, similarly, by electrolytic plating, second plating layer 122 containing Ni is formed on first plating layer 121 and second plating layer 132 containing Ni is formed on first plating layer 131. Subsequently, similarly, by electrolytic plating, third plating layer 123 containing Sn is formed on second plating layer 122 and third plating layer 133 containing Sn is formed on second plating layer 132.

Subsequently, the chip is marked (step S13). Specifically, a mark for making first external electrode 120 and second external electrode 130 identifiable is marked on first main surface 110a or second main surface 110b of insulating resin body 110 with a laser marker or the like.

Again, as shown in FIG. 7, in solid electrolytic capacitor 100 according to the embodiment, leading conductor layer 180 is visible when insulating resin body 110 is seen on the side of second main surface 110b. Thus, in the process for producing solid electrolytic capacitor 100, after first external electrode 120 and second external electrode 130 are formed in step S12, then, in step S13, by observing insulating resin body 110 on the second main surface 110b side, first external electrode 120 and second external electrode 130 can be identified by confirming the arrangement of leading conductor layer 180. Based on the identified result, the mark for making first external electrode 120 and second external electrode 130 identifiable can be marked on first main surface 110a or second main surface 110b of insulating resin body 110.

If leading conductor layer 180 is invisible with insulating resin body 110 seen on the second main surface 110b side, the marking must be done in a state in which insulating resin body 110 has first end surface 110e and second end surface 110f exposed, i.e., before first external electrode 120 and second external electrode 130 are formed. When the marking is done before first external electrode 120 and second external electrode 130 are formed, the mark will be erased by microetching performed in step S11, and first external electrode 120 and second external electrode 130 cannot be identified. Accordingly, in that case, it is necessary to perform marking which is not erased by microetching, which increases a restriction on a condition for producing the solid electrolytic capacitor.

In solid electrolytic capacitor 100 according to the present embodiment, when insulating resin body 110 is seen on the second main surface 110b side, leading conductor layer 180 is visible, and a degree of freedom of a condition for producing the solid electrolytic capacitor can be increased.

Through the series of the steps described above, solid electrolytic capacitor 100 can be produced. It should be noted that step S13 is not necessarily performed.

Solid electrolytic capacitor 100 according to the present embodiment has first external electrode 120 and second external electrode 130 each composed of a plating layer and accordingly does not require routing an anode terminal and a cathode terminal outside resin, as done for a solid electrolytic capacitor described in International Publication No. 2013/088954. As a result, solid electrolytic capacitor 100 can be miniaturized while it has ESR and ESL reduced. In addition, solid electrolytic capacitor 100 can have an electrostatic capacity increased per unit volume.

Furthermore, solid electrolytic capacitor 100 according to the present embodiment is such that second external electrode 130 is connected to metal layer 141 at second end surface 110f and An external surface of dielectric layer 150 located on a side opposite to that of cathode portion 160 and free of solid electrolyte layer 161, and provided on an external surface of metal layer 141 closer to second end surface 110f, is covered with insulating resin layer 151, and accordingly, solid electrolytic capacitor 100 according to the present embodiment does not require routing an anode terminal outside resin, as done for the solid electrolytic capacitor described in International Publication No. 2013/088954. As a result, solid electrolytic capacitor 100 can be miniaturized while maintaining reliability.

Furthermore, since each of first external electrode 120 and second external electrode 130 has a Ni plating layer and a Sn plating layer, solid electrolytic capacitor 100 is improved in mountability. Specifically, the Ni plating layer has a function to prevent a Cu plating layer from being eroded by solder when mounting solid electrolytic capacitor 100. The Sn plating layer has a function to improve wettability with solder when mounting solid electrolytic capacitor 100, and facilitate mounting solid electrolytic capacitor 100.

In solid electrolytic capacitor 100 according to the present embodiment, insulating resin body 110 has first end surface 110e and second end surface 110f with a surface roughness (Ra) of 2.2 μm or more and 8.3 μm or less, and peeling of first external electrode 120 and second external electrode 130 off insulating resin body 110 can be suppressed.

Figure 9:
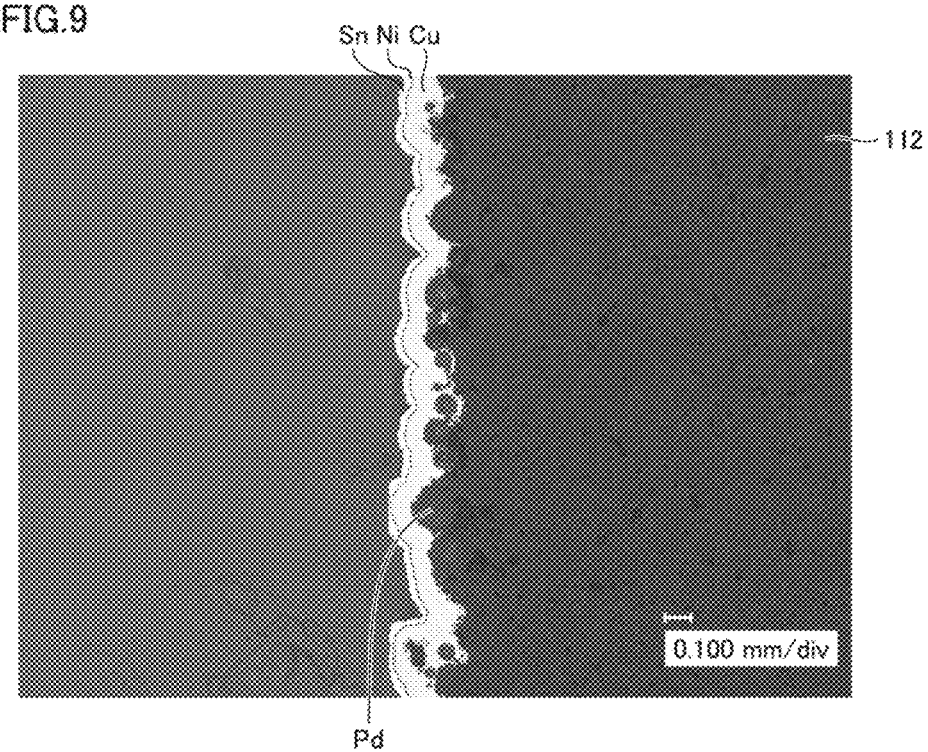
FIG. 9 is an image obtained by observing with an optical microscope a portion of a lengthwise end portion of a solid electrolytic capacitor according to the embodiment.

FIG. 9 is an image obtained by observing with an optical microscope a portion of a lengthwise end portion of a solid electrolytic capacitor according to the embodiment.

As shown in FIG. 9, first end surface 110e and second end surface 110f of insulating resin body 110 each have a rough surface with fine recesses and projections. First plating layers 121 and 131 containing Cu are each formed so as to enter these fine recesses and projections and their adhesion to insulating resin body 110 is enhanced by an anchor effect. As a result, peeling of first and second external electrodes 120 and 130 off insulating resin body 110 is suppressed.

Exemplary Experiment 1

Hereinafter, exemplary experiment 1 will be described which investigated a relationship between a surface roughness of an end surface of the insulating resin body and a rate of occurrence of peeling of an external electrode.

The insulating resin body had an end surface with surface roughnesses (Ra) of 8.3 μm in Example 1, 5.1 μm in Example 2, 2.2 μm in Example 3, 9.2 μm in Comparative Example 1, 0.4 μm in Comparative Example 2 and 0.1 μm in Comparative Example 3. Whether an external electrode formed by barrel plating peeled or not was investigated. 100 samples were prepared for each of Example 1, Example 2, Comparative Example 1 and Comparative Example 2. The surface roughness (Ra) of the end surface of the insulating resin body is determined by removing an external electrode with a stripping agent such as an en strip or a mel strip to expose an end surface of the insulating resin body, and measuring the surface roughness (Ra) using a laser microscope at a position of a center portion in widthwise direction W and a center portion in heightwise direction T.

TABLE 1

|  | surface roughness (Ra) of end surface of insulating resin body (Ra) | rate of occurrence of peeling of external electrode (%) |
|---|---|---|
| comparative example 1 | 9.2 | 10 |
| example 1 | 8.3 | 0 |
| example 2 | 5.1 | 1 |
| example 3 | 2.2 | 3 |
| comparative example 2 | 0.4 | 26 |
| comparative example 3 | 0.1 | 41 |

Table 1 is a table showing a result of exemplary experiment 1. As shown in Table 1, in Example 1, in which the surface roughness (Ra) of the end surface of the insulating resin body was 8.3 μm, no solid electrolytic capacitor having the external electrode peeled off was observed. In Example 2, in which the surface roughness (Ra) of the end surface of the insulating resin body was 5.1 μm, the rate of occurrence of peeling of the external electrode was 1%, which was no larger than 5%. In Example 3, in which the surface roughness (Ra) of the end surface of the insulating resin body was 2.2 the rate of occurrence of peeling of the external electrode was 3%, which was no larger than 5%.

In contrast, in comparative example 1, in which the surface roughness (Ra) of the end surface of the insulating resin body was 9.2 μm, the rate of occurrence of peeling of the external electrode was 10%, which was higher than 5%. In comparative example 2, in which the surface roughness (Ra) of the end surface of the insulating resin body was 0.4 μm, the rate of occurrence of peeling of the external electrode was 26%, which was higher than 5%. In comparative example 3, in which the surface roughness (Ra) of the end surface of the insulating resin body was 0.1 μm, the rate of occurrence of peeling of the external electrode was 41%, which was higher than 5%.

From the result of exemplary experiment 1, it has been confirmed that when the surface roughness (Ra) of the end surface of the insulating resin body is 2.2 μm or more and 8.3 μm or less, the rate of occurrence of peeling of the external electrode can be reduced to 5% or less.

In solid electrolytic capacitor 100 according to the present embodiment, an external surface of dielectric layer 150 located on a side opposite to that of cathode portion 160 and free of solid electrolyte layer 161, and provided on an external surface of metal layer 141 closer to second end surface 110f, is covered with insulating resin layer 151, so that insulating resin layer 151 can suppress penetration of a plating solution plating an end surface of metal layer 141 in step S10 into insulating resin body 110 along an external surface of dielectric layer 150.

In solid electrolytic capacitor 100 according to the present embodiment, a length of insulating resin layer 151 in lengthwise direction L equal to or greater than the length of insulating resin body 110 in lengthwise direction L multiplied by 0.025 and equal to or less than the length of insulating resin body 110 in lengthwise direction L multiplied by 0.5, allows solid electrolytic capacitor 100 to maintain an electrostatic capacity and have a reduced ESR while ensuring reliability.

Exemplary Experiment 2

Exemplary experiment 2 will be described which was conducted to investigate how the length of the insulating resin layer influences the solid electrolytic capacitor's electrostatic capacity, ESR and reliability.

A ratio of the length of the insulating resin layer in lengthwise direction L to the length of the insulating resin body in lengthwise direction L was 0.025 in Example 4, 0.05 in Example 5, 0.1 in Example 6, 0.15 in Example 7, 0.2 in Example 8, 0.25 in Example 9, 0.3 in Example 10, 0.35 in Example 11, 0.4 in Example 12, 0.45 in Example 13, 0.5 in Example 14, 0.01 in Comparative Example 4, 0.7 in Comparative Example 5, and 0.9 in Comparative Example 6. Each solid electrolytic capacitor's electrostatic capacity (μF), ESR (me) and leakage current (μA) were measured.

TABLE 2

|  | ratio of length of insulating resin layer to length of insulating resin body | electrostatic capacity (μF) | ESR (mΩ) | leakage current (μA) |
| --- | --- | --- | --- | --- |
| example 4 | 0.025 | 33.9 | 25.8 | 0.08 |
| example 5 | 0.05 | 33.2 | 25.3 | 0.1 |
| example 6 | 0.1 | 33.5 | 25.6 | 0.05 |
| example 7 | 0.15 | 33.7 | 24.9 | 0.01 |
| example 8 | 0.2 | 32.9 | 25.1 | 0.02 |
| example 9 | 0.25 | 32.9 | 25.5 | 0.03 |
| example 10 | 0.3 | 32.7 | 26.7 | 0.02 |
| example 11 | 0.35 | 32.6 | 26.8 | 0.02 |
| example 12 | 0.4 | 31.9 | 26.5 | 0.03 |
| example 13 | 0.45 | 31.5 | 26.9 | 0.03 |
| example 14 | 0.5 | 31.5 | 27.3 | 0.03 |
| comparative example 4 | 0.01 | 33.1 | 25.6 | 11560 |
| comparative example 5 | 0.7 | 21.5 | 60.0 | 0.03 |
| comparative example 6 | 0.9 | 15.5 | 90.0 | 0.02 |

Table 2 is a table showing a result of exemplary experiment 2. As shown in Table 2, in Examples 4 to 14, in which the length of the insulating resin layer in lengthwise direction L is equal to or greater than the length of the insulating resin body in lengthwise direction L multiplied by 0.025 and equal to or less than the length of the insulating resin body in lengthwise direction L multiplied by 0.5, the solid electrolytic capacitors had an electrostatic capacity of 30 μF or more, an ESR of 30 mΩ or less, and a leakage current of 0.2 μA or less.

In contrast, in Comparative Example 4, in which the length of the insulating resin layer in lengthwise direction L is less than the length of the insulating resin body in lengthwise direction L multiplied by 0.05, a significantly high leakage current is observed, and the solid electrolytic capacitor had low reliability. That is, in step S10 when an end surface of metal layer 141 is plated with a plating solution the plating solution may penetrate into insulating resin body 110 along an external surface of dielectric layer 150 and cause a short circuit.

In Comparative Examples 5 and 6, in which the length of the insulating resin layer in lengthwise direction L is larger than the length of the insulating resin body in lengthwise direction L multiplied by 0.5, the solid electrolytic capacitors had an electrostatic capacity less than 30 μF and an ESR higher than 30 mΩ.

From the result of exemplary experiment 2, it has been confirmed that the length of insulating resin layer 151 in lengthwise direction L being equal to or greater than the length of insulating resin body 110 in lengthwise direction L multiplied by 0.025 and equal to or less than the length of insulating resin body 110 in lengthwise direction L multiplied by 0.5 ensures that the solid electrolytic capacitor is reliable while maintaining an electrostatic capacity and reducing ESR.

Insulating resin layer 151 having a thickness of 5 μm or more and 30 μm or less ensures that the solid electrolytic capacitor is reliable.

Exemplary Experiment 3

Exemplary experiment 3 will be described which was conducted to investigate how the thickness of insulating resin layer 151 influences the external appearance of insulating resin body 110 and the solid electrolytic capacitor's reliability.

The insulating resin layer was 5 μm in Example 15, 15 μm in Example 16, 30 μm in Example 17, 2 μm in Comparative Example 7, and 100 μm in Comparative Example 8 in thickness. The chip produced in step S8 was observed, and when a capacitor element uncovered with the mold portion of the insulating resin body was confirmed, it was determined that the insulating resin body had a poor appearance. The solid electrolytic capacitors' leakage currents (μA) were measured.

TABLE 3

|  | Thickness of insulating resin layer (μm) | Appearance of insulating resin body | Leakage current (μA) |
| --- | --- | --- | --- |
| example 15 | 5 | good | 0.16 |
| example 16 | 15 | good | 0.09 |
| example 17 | 30 | good | 0.05 |
| comparative example 7 | 2 | good | 13347 |
| comparative example 8 | 100 | not good | 0.07 |

Table 3 shows a result of exemplary experiment 3. As shown in Table 3, Examples 15 to 17, in which the insulating resin layer had a thickness of 5 μm or more and 30 μm or less, provided an insulating resin body in a good appearance and provided a leakage current of 0.2 μA or less.

In contrast, Comparative Example 7, in which the insulating resin layer had a thickness less than 5 μm, provided an extremely large leakage current and hence a solid electrolytic capacitor having low reliability. That is, when insulating resin layer 151 has a thickness less than 5 μm, insulating resin layer 151 cannot effectively suppress penetration of a plating solution plating an end surface of metal layer 141 in step S10 into insulating resin body 110 along an external surface of dielectric layer 150.

In Comparative Example 8, in which insulating resin layer 151 has a thickness larger than 30 μm, the thickness of the stack of the plurality of capacitor elements is larger than the thickness of the mold portion, and a capacitor element uncovered with the mold portion of the insulating resin body was confirmed and the insulating resin body thus had a poor external appearance. Furthermore, in that case, when the plurality of capacitor elements are stacked, adjacent capacitor elements have their current collector layers connected unstably, and the solid electrolytic capacitor is impaired in reliability.

Note that the length of the insulating resin layer in lengthwise direction L and the thickness of the insulating resin layer can be measured as follows: the insulating resin body is polished to a position of about ½ of a dimension thereof in widthwise direction W to expose a cross section along lengthwise direction L and heightwise direction T, and the cross section is imaged using a scanning electron microscope (SEM) or the like. In exemplary experiment 2, the length of the insulating resin layer in lengthwise direction L was represented by an average value of measurement values of five capacitor elements.

In solid electrolytic capacitor 100 according to the present embodiment, a length of leading conductor layer 180 in lengthwise direction L being equal to or greater than the length of insulating resin body 110 in lengthwise direction L multiplied by 0.3 and equal to or less than the length of insulating resin body 110 in lengthwise direction L multiplied by 0.8 allows the solid electrolytic capacitor to have a reduced ESR while ensuring that the solid electrolytic capacitor is reliable.

When a length of leading conductor layer 180 in lengthwise direction L is less than the length of insulating resin body 110 in lengthwise direction L multiplied by 0.3, the solid electrolytic capacitor has an ESR higher than 30 mΩ. When a length of leading conductor layer 180 in lengthwise direction L is larger than the length of insulating resin body 110 in lengthwise direction L multiplied by 0.8, a short circuit may occur between leading conductor layer 180 and second external electrode 130, and the solid electrolytic capacitor is impaired in reliability.

Leading conductor layer 180 having a thickness of 10 μm or more and 100 μm or less allows solid electrolytic capacitor 100 to be miniaturized while having a reduced ESR. When the thickness of leading conductor layer 180 is less than 10 μm, the solid electrolytic capacitor has an ESR higher than 30 mΩ. When the thickness of leading conductor layer 180 is larger than 100 μm, the solid electrolytic capacitor is prevented from being miniaturized.

In solid electrolytic capacitor 100 according to the present embodiment, the distance in lengthwise direction L between a position closest to first end surface 110e at a portion where leading conductor layer 180 and connecting conductor layer 190 are connected together and first end surface 110e being 87.5 μm or more and 1750 μm or less allows solid electrolytic capacitor 100 to be miniaturized while ensuring that the solid electrolytic capacitor is reliable.

When the above distance is less than 87.5 μm, then, in step S10 when a plating solution used to plate an end surface of metal layer 141 penetrates along an external surface of leading conductor layer 180 the plating solution may reach a capacitor element, and impair the solid electrolytic capacitor in reliability. When the above distance is larger than 1750 μm, the solid electrolytic capacitor is prevented from being miniaturized.

Note that the length of the leading conductor layer in lengthwise direction L and the above distance, and the thickness of the leading conductor layer can be measured as follows: the insulating resin body is polished to a position of about ½ of a dimension thereof in widthwise direction W to expose a cross section along lengthwise direction L and heightwise direction T, and the cross section is imaged using a scanning electron microscope (SEM) or the like.

Exemplary Experiment 4

FIG. 10 shows images of solid electrolytic capacitors according to Examples 18-22 at first and second end surfaces each in a front view. With reference to FIG. 10, the first and second end surfaces of the solid electrolytic capacitors according to Examples 18 to 22 will be described.

Solid electrolytic capacitors each having a structure similar to that of the embodiment produced using a production method in the above embodiment were prepared as the solid electrolytic capacitors according to Examples 18 to 22. First external electrode 120 on the first end surface 110e side and second external electrode 130 on the second end surface 110f side of each of the solid electrolytic capacitors according to Examples 18 to 22 were observed with an optical microscope.

In each observation result in FIG. 10, a central bright portion (or white portion) is an external electrode located on the first or second end surface, and a substantially gray portion surrounding the bright portion is a portion of the external electrode located on the first or second chamfered portion. It should be noted that the gray portion is surrounded by a black portion serving as a background.

None of the solid electrolytic capacitors according to Examples 18 to 22 was observed such that first external electrode 120 and second external electrode 130 peeled off the first end surface 110e side and the second end surface 110f side, and they were in a satisfactory state.

Comparative Examples

Figure 11:
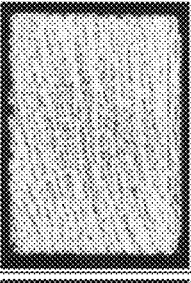
FIG. 11 shows images of solid electrolytic capacitors according to comparative examples 9-13 at first and second end surfaces each in a front view.

FIG. 11 shows images of solid electrolytic capacitors according to comparative examples 9-13 at first and second end surfaces each in a front view. With reference to FIG. 11, the first and second end surfaces of the solid electrolytic capacitors according to comparative examples 9-13 will be described.

As the solid electrolytic capacitors according to Comparative Examples 9 to 13, solid electrolytic capacitors produced according mutatis mutandis to a production method in the above embodiment were prepared. Specifically, the solid electrolytic capacitor was produced as follows: in the production method according to the embodiment, step S9 of barreling a cut chip was omitted, and an external electrode was formed on an end surface side of the chip immediately after it was cut. In other words, the solid electrolytic capacitors according to Comparative Examples 9 to 13 do not have the first chamfered portion and the second chamfered portion.

First external electrode 120 on the first end surface 110e side and second external electrode 130 on the second end surface 110f side of each of the solid electrolytic capacitors according to Comparative Examples 9 to 13 were observed with an optical microscope.

FIG. 11 shows observation results, which show that a central bright portion (or white portion) is an external electrode provided on the first or second end surface. In FIG. 11, as compared with FIG. 9, a substantially gray portion is not observed around the bright portion, and the first chamfered portion and the second chamfered portion are not formed.

In the solid electrolytic capacitors of Comparative Examples 9 to 11, an external electrode was partially peeled around an end surface on either the first end surface's side or the second end surface's side.

In the solid electrolytic capacitor according to Comparative Example 12, first external electrode 120 significantly peeled off on the first end surface's side, in particular.

In contrast, the solid electrolytic capacitor according to Comparative Example 13 was not observed such that first external electrode 120 and second external electrode 130 peeled off the first end surface 110e side and the second end surface 110f side, and the solid electrolytic capacitor was thus in a satisfactory state.

Comparing Examples 18 to 22 with Comparative Examples 9 to 13

Comparing the result of the Examples and that of the comparative examples, it has also confirmed through an experiment that providing insulating resin body 110 with the first chamfered portion and the second chamfered portion and providing the first external electrode and the second external electrode so as to cover the first chamfered portion and the second chamfered portion, can suppress peeling of the first external electrode and the second external electrode off an end surface side of the insulating resin body in which a capacitor element is buried.

Thus in solid electrolytic capacitor 100 according to the embodiment, first external electrode 120 extending across first connecting portion 1101, second connecting portion 1102, fifth connecting portion 1105, and sixth connecting portion 1106 and extending along the first and second chamfered portions can alleviate a stress acting on first external electrode 120 at a boundary between first end surface 110e and first and second main surfaces 110a and 110b and enhance adhesion of first external electrode 120 to a surface of insulating resin body 110 on the side of first end surface 110e. This can increase adhesion strength of first external electrode 120 and suppress peeling of first external electrode 120 off the insulating resin body at the time of formation or after production. As a result, solid electrolytic capacitor 100 can be improved in reliability.

Furthermore, second external electrode 130 extending across third connecting portion 1103, fourth connecting portion 1104, seventh connecting portion 1107, and eighth connecting portion 1108 and extending along the first and second chamfered portions can alleviate a stress acting on second external electrode 130 at a boundary between second end surface 110f and first and second main surfaces 110a and 110b and enhance adhesion of second external electrode 130 to a surface of insulating resin body 110 on the side of second end surface 110f. This can increase adhesion strength of second external electrode 130 and suppress peeling of second external electrode 130 off the insulating resin body at the time of formation or after production. As a result, solid electrolytic capacitor 100 can be improved in reliability.

While in the embodiment described above a case has been described in which on the first end surface 110e side, first connecting portion 1101 and second connecting portion 1102 are provided with the first chamfered portion and fifth connecting portion 1105 and sixth connecting portion 1106 are provided with the second chamfered portion by way of example, this is not exclusive and it suffices that at least first connecting portion 1101 and second connecting portion 1102 are provided with the first chamfered portion. In that case, it suffices that first external electrode 120 is provided to extend from at least first end surface 110e to first main surface 110a and second main surface 110b across first connecting portion 1101 and second connecting portion 1102. This configuration also allows first external electrode 120 to extend along the first chamfered portion and can thus enhance adhesion between first external electrode 120 and insulating resin body 110 and suppress peeling of first external electrode 120.

Similarly, While in the embodiment described above a case has been described in which on the second end surface 110f side, third connecting portion 1103 and fourth connecting portion 1104 are provided with the first chamfered portion and seventh connecting portion 1107 and eighth connecting portion 1108 are provided with the second chamfered portion by way of example, this is not exclusive and it suffices that at least third connecting portion 1103 and fourth connecting portion 1104 are provided with the first chamfered portion. In that case, it suffices that second external electrode 130 is provided to extend from at least second end surface 110f to first main surface 110a and second main surface 110b across third connecting portion 1103 and fourth connecting portion 1104. This configuration also allows second external electrode 130 to extend along the first chamfered portion and can thus enhance adhesion between second external electrode 130 and insulating resin body 110 and suppress peeling of second external electrode 130.

Note that, as in the embodiment, by providing first connecting portion 1101 and second connecting portion 1102 with the first chamfered portion and providing fifth connecting portion 1105 and sixth connecting portion 1106 with the second chamfered portion, and providing first external electrode 120 to extend from first end surface 110e across first connecting portion 1101, second connecting portion 1102, fifth connecting portion 1105, and sixth connecting portion 1106 to first and second main surfaces 110a and 110b and first and second side surfaces 110c and 110d, first external electrode 120 can be more firmly adhered to insulating resin body 110. By also configuring the second end surface 110f side to be similar to the first end surface 110e side, second external electrode 130 can be more firmly adhered to insulating resin body 110.

In the description of the embodiment described above, combinable configurations may be combined with each other.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A solid electrolytic capacitor comprising: at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer; a leading conductor layer electrically connected to the current collector layer; an insulating resin body covering the capacitor element and the leading conductor layer, the insulating resin body having a first end surface and a second end surface opposite to each other along a first direction; a first external electrode including at least one first plating layer on the first end surface, the at least one first plating layer being directly connected to the leading conductor layer; and a second external electrode including at least one second plating layer on the second end surface; the at least one second plating layer being directly connected to the metal layer: the insulating resin body including: (a) a first insulating resin body having the leading conductor layer on a surface thereof, and a second insulating resin body on the first insulating resin body so as to cover the leading conductor layer and the plurality of capacitor elements, the second insulating resin body having a different composition than the first insulating resin body; (b) a first main surface and a second main surface opposite to each other in a second direction orthogonal to the first direction, and a first side surface and a second side surface opposite to each other in a third direction orthogonal to the first direction and the second direction; (c) a first connecting portion connecting the first end surface and the first main surface, a second connecting portion connecting the first end surface and the second main surface, a third connecting portion connecting the second end surface and the first main surface, and a fourth connecting portion connecting the second end surface and the second main surface; the first connecting portion, the second connecting portion, the third connecting portion, and the fourth connecting portion each have a first chamfered portion; wherein: the first external electrode is formed along the first end surface and the first chamfered portions of the first connecting portion and the second connecting portion; and the second external electrode is formed along the second end surface and the first chamfered portions of the third connecting portion and the fourth connecting portion.

2. The solid electrolytic capacitor according to claim 1, wherein:
the at least one first plating layer includes a first Cu-containing layer on the first end surface, a second Ni-containing layer on the first layer, and a third Sn-containing layer on the second layer;
the at least one second plating layer includes a fourth Cu-containing layer on the second end surface, a fifth Ni-containing layer on the fourth layer, and a sixth Sn-containing layer on the fourth layer.

3. The solid electrolytic capacitor according to claim 1, wherein the metal layer contains Al.

4. The solid electrolytic capacitor according to claim 3, wherein the dielectric layer is an oxide of Al.

5. The solid electrolytic capacitor according to claim 1, further comprising an insulating resin layer different in composition from the insulating resin body covering an external surface of the dielectric layer on a portion of the metal layer free of the solid electrolyte layer and on a side of the second end surface.

6. The solid electrolytic capacitor according to claim 5, wherein a length of the insulating resin layer in the first direction is equal to or greater than a length of the insulating resin body in the first direction multiplied by 0.025 and equal to or less than the length of the insulating resin body in the first direction multiplied by 0.5.

7. The solid electrolytic capacitor according to claim 5, wherein the insulating resin layer has a thickness of 5 µm to 30 µm.

8. The solid electrolytic capacitor according to claim 5, wherein the insulating resin layer includes polyimide resin or polyamideimide resin.

9. The solid electrolytic capacitor according to claim 1, wherein:
the at least one capacitor element is a plurality of capacitor elements;
the plurality of capacitor elements are stacked in a second direction orthogonal to the first direction such that mutually adjacent capacitor elements have their respective current collector layers electrically connected to each other; and
the current collector layer of only one capacitor element of the plurality of capacitor elements that is adjacent to the leading conductor layer is electrically connected to the leading conductor layer.

10. The solid electrolytic capacitor according to claim 1, wherein the first end surface and the second end surface each have a surface roughness of 2.2 µm to 8.3 µm.

11. A solid electrolytic capacitor comprising: at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer; a leading conductor layer electrically connected to the current collector layer; an insulating resin body covering the capacitor element and the leading conductor layer, the insulating resin body having a first end surface and a second end surface opposite to each other along a first direction; a first external electrode including at least one first plating layer on the first end surface, the at least one first plating layer being directly connected to the leading conductor layer; and a second external electrode including at least one second plating layer on the second end surface, the at least one second plating layer being directly connected to the metal layer; the insulating resin body including: (a) a first insulating resin body having the leading conductor layer on a surface thereof, and a second insulating resin body located on the first insulating resin body so as to cover both the leading conductor layer and the plurality of capacitor elements, the second insulating resin body having a different composition than the first insulating resin body; (b) a first main surface and a second main surface opposite to each other in a second direction orthogonal to the first direction, and a first side surface and a second side surface opposite to each other in a third direction orthogonal to the first direction and the second direction; c) a first connecting portion connecting the first end surface and the first main surface, a second connecting portion connecting the first end surface and the second main surface, a third connecting portion connecting the second end surface and the first main surface, and a fourth connecting portion connecting the second end surface and the second main surface; the first external electrode extending from at least the first end surface to the first main surface and the second main surface across the first connecting portion and the second connecting portion; wherein: the second external electrode extends from at least the second end surface to the first main surface and the second main surface across the third connecting portion and the fourth connecting portion; and the first connecting portion, the second connecting portion, the third connecting portion, and the fourth connecting portion each have a first chamfered portion.

12. The solid electrolytic capacitor according to claim 11, wherein:
the insulating resin body has a fifth connecting portion connecting the first end surface and the first side surface, a sixth connecting portion connecting the first end surface and the second side surface, a seventh connecting portion connecting the second end surface and the first side surface, and an eighth connecting portion connecting the second end surface and the second side surface;
the first external electrode extends from the first end surface across the first connecting portion, the second connecting portion, the fifth connecting portion, and the sixth connecting portion to the first and second main surfaces and the first and second side surfaces;
the second external electrode extends from the second end surface across the third connecting portion, the fourth connecting portion, the seventh connecting portion, and the eighth connecting portion to the first and second main surfaces and the first and second side surfaces; and
the fifth connecting portion, the sixth connecting portion, the seventh connecting portion, and the eighth connecting portion each have a second chamfered portion.

13. A solid electrolytic capacitor comprising:
at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer;
a leading conductor layer electrically connected to the current collector layer;
an insulating resin body covering the capacitor element and the leading conductor layer, the insulating resin body having a first end surface and a second end surface opposite to each other;
a first external electrode including at least one first plating layer on the first end surface and electrically connected to the leading conductor layer; and
a second external electrode including at least one second plating layer on the second end surface and electrically connected to the metal layer,
wherein a plurality of conductive particles are present in each of the first end surface and the second end surface.

14. The solid electrolytic capacitor according to claim 13, wherein the conductive particles include Pd.

15. A solid electrolytic capacitor comprising:
at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer;
a leading conductor layer electrically connected to the current collector layer;
an insulating resin body covering the capacitor element and the leading conductor layer, the insulating resin body having a first end surface and a second end surface opposite to each other;
a first external electrode including at least one first plating layer on the first end surface and electrically connected to the leading conductor layer;
a second external electrode including at least one second plating layer on the second end surface and electrically connected to the metal layer;
a first plating film containing Zn covering an end surface of the metal layer at the second end surface; and
a second plating film containing Ni covering the first plating film,
wherein the first plating film and the second plating film are positioned between the second external electrode and the metal layer such that the second external electrode is indirectly electrically connected to the metal layer.

16. A solid electrolytic capacitor comprising:
at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer;
a leading conductor layer electrically connected to the current collector layer;
an insulating resin body covering the capacitor element and the leading conductor layer, the insulating resin body having a first end surface and a second end surface opposite to each other;
a first external electrode including at least one first plating layer on the first end surface and electrically connected to the leading conductor layer; and
a second external electrode including at least one second plating layer on the second end surface and electrically connected to the metal layer,
wherein the insulating resin body has a first main surface and a second main surface opposite to each other in a second direction orthogonal to the first direction, and a first side surface and a second side surface opposite to each other in a third direction orthogonal to the first direction and the second direction;
the insulating resin body has a first connecting portion connecting the first end surface and the first main surface, a second connecting portion connecting the first end surface and the second main surface, a third connecting portion connecting the second end surface and the first main surface, and a fourth connecting portion connecting the second end surface and the second main surface;
the first external electrode extends from at least the first end surface to the first main surface and the second main surface across the first connecting portion and the second connecting portion;
the second external electrode extends from at least the second end surface to the first main surface and the second main surface across the third connecting portion and the fourth connecting portion;
the first connecting portion, the second connecting portion, the third connecting portion, and the fourth connecting portion each have a first chamfered portion, the first chamfered portion has a curved shape in a cross-sectional view with respect to the third direction, and
a first radius of curvature of the first chamfered portion of the first and third connecting portions is larger than a second radius of curvature of the first chamfered portion of the second and fourth connecting portions.

17. A solid electrolytic capacitor comprising:
at least one capacitor element including an anode portion composed of a metal layer extending in a first direction and having an external surface with a plurality of recesses, a dielectric layer on the external surface of the metal layer, and a cathode portion having a solid electrolyte layer on the dielectric layer and a current collector layer on the solid electrolyte layer;
a leading conductor layer electrically connected to the current collector layer;
an insulating resin body covering the capacitor element and the leading conductor layer, the insulating resin body having a first end surface and a second end surface opposite to each other;
a first external electrode including at least one first plating layer on the first end surface and electrically connected to the leading conductor layer; and
a second external electrode including at least one second plating layer on the second end surface and electrically connected to the metal layer,
wherein the insulating resin body has a first main surface and a second main surface opposite to each other in a second direction orthogonal to the first direction, and a first side surface and a second side surface opposite to each other in a third direction orthogonal to the first direction and the second direction;
the insulating resin body has a first connecting portion connecting the first end surface and the first main surface, a second connecting portion connecting the first end surface and the second main surface, a third connecting portion connecting the second end surface and the first main surface, and a fourth connecting portion connecting the second end surface and the second main surface;
the first external electrode extends from at least the first end surface to the first main surface and the second main surface across the first connecting portion and the second connecting portion;

the second external electrode extends from at least the second end surface to the first main surface and the second main surface across the third connecting portion and the fourth connecting portion;

the first connecting portion, the second connecting portion, the third connecting portion, and the fourth connecting portion each have a first chamfered portion, the first chamfered portion has a curved shape in a cross-sectional view with respect to the third direction;

the insulating resin body includes a first insulating resin portion on a side of the first main surface and which defines the first main surface and a second insulating resin portion on a side of the second main surface and which defines the second main surface;

the second insulating resin portion is made of a material harder than that of the first insulating resin portion; and the first chamfered portion of the first and third connecting portions is rounder than the first chamfered portion of the second and fourth connecting portions.

* * * * *